United States Patent [19]

Davidson

[11] Patent Number: 5,582,015
[45] Date of Patent: Dec. 10, 1996

[54] LIQUID NITROGEN CAPILLARY HEAT EXCHANGER

[75] Inventor: James G. Davidson, Paris, Tenn.

[73] Assignee: Ecometrics Corp., Paris, Tenn.

[21] Appl. No.: 364,663

[22] Filed: Dec. 27, 1994

[51] Int. Cl.$^6$ ................................................. F17C 9/02
[52] U.S. Cl. .................. 62/50.2; 62/50.4; 165/DIG. 183
[58] Field of Search ............................ 165/183; 62/50.2, 62/50.3, 50.4, 515, 525, 527

[56] References Cited

U.S. PATENT DOCUMENTS

| | | | |
|---|---|---|---|
| 2,823,521 | 2/1958 | Enger et al. | 62/50.2 |
| 2,833,121 | 5/1958 | Dorf | 62/50.2 |
| 2,943,459 | 7/1960 | Rind | 62/50.2 X |
| 3,035,423 | 5/1962 | Mendez | 62/50.2 X |
| 3,058,317 | 10/1962 | Putman | 62/50.2 |
| 3,662,561 | 5/1972 | Schroeder | 62/50.2 X |
| 3,714,793 | 2/1973 | Eigenbrod | 62/50.2 X |
| 4,566,284 | 1/1986 | Werley | 62/50.2 |
| 5,157,944 | 10/1992 | Hughes et al. | 62/515 |
| 5,199,275 | 4/1993 | Martin | 62/50.3 X |
| 5,267,446 | 12/1993 | Viegas et al. | 62/50.2 |

Primary Examiner—Christopher Kilner
Attorney, Agent, or Firm—Waters & Morse, P.C.

[57] ABSTRACT

A liquid nitrogen capillary tube heat exchanger comprises a vertical array of alternating vaporization chambers and pressure control chambers connected together in series. The vaporization chambers each have a plurality of capillary tubes mounted in exterior loops along the exterior of the chamber in communication with liquid nitrogen in the chamber. The capillary tubes provide a contolled rate of vaporization of the liquid nitrogen and increased exterior surface area to facilitate refrigeration. The pressure control chambers are filled with copper filings and a dessicant.

9 Claims, 3 Drawing Sheets

LIQUID NITROGEN CAPILLARY HEAT EXCHANGER

BACKGROUND OF THE INVENTION

This invention relates to a liquid nitrogen capillary action heat exchanger that is particularly well suited for use in refrigerated transportation storage containers.

Refrigerated trucks and other refrigerated transportation containers typically use conventional refrigerating systems operated by diesel engines. In such systems, a compressor operated by the diesel engine compresses gaseous freon or like refrigerant until it is transformed into a liquid. The pressure on the liquid is then released through an expansion valve, and the refrigerant is passed through a heat exchanger in the refrigerated container. The liquid vaporizes in the heat exchanger, and this absorbs heat and chills the heat exchanger coils, cooling the container.

While this system is used widely, there are a number of drawbacks with the system. Diesel engines are noisy and dirty and require fuel and need repairs from time to time. They also produce undesirable gaseous emissions. The refrigerating units themselves typically use freon, which also is an undesirable pollutant when released to the atmosphere, which occasionally occurs.

Other refrigerants and processes have been used for refrigeration systems. Liquid nitrogen is one such refrigerant. Liquid nitrogen vaporizes at a much lower temperature than freon and thus provides a much colder refrigerant than conventional freon when released through a heat exchanger. Liquid nitrogen is available in pressurized containers and can be released through a heat exchanger and then to the atmosphere. Since nitrogen is the major component of air, the release of nitrogen poses no pollution threat.

Notwithstanding the advantages of nitrogen, there is considerable difficulty in handling and utilizing nitrogen in a refrigeration system. Since the vaporization temperature of nitrogen is much lower than conventional refrigerants, nitrogen flashes into gaseous form very rapidly and produces great pressure at normal atmospheric temperatures. The cooling thus occurs all at once, which is inefficient, and the pressure cannot be handled by a conventional heat exchanger.

It is an object of the present invention to provide a liquid nitrogen refrigeration system having improved and controlled cooling characteristics.

SUMMARY OF THE INVENTION

In accordance with the present invention, a heat exchanger for vaporizing liquid nitrogen received from a pressurized container comprises a vaporization chamber having an inlet connected to the liquid nitrogen container through a pressure release valve. The chamber comprises an elongated enlarged tubular chamber having enclosed exterior walls that are capable of withstanding the vaporization pressures exerted by the liquid nitrogen. A plurality of capillary tubes are mounted on the exterior of the chamber and spaced along the chamber, with the capillary tubes having inlets and outlets in communication with the interior of the chamber and forming loops extending between the inlets and the outlets on the exterior of the chamber. The inlets of the capillary tubes are positioned in the chamber such that liquid nitrogen in the lower portion of the chamber can flow into the capillary tubes through the inlets. The capillary tubes restrict vaporization of the liquid nitrogen under controlled pressure and heat transfer conditions that are not present in the chamber, with the exterior walls of the capillary tubes providing increased surface area for cooling purposes. After the nitrogen has passed through the capillary tube, the liquid starts to vaporize and absorb heat from the refrigeration compartment on the outside of the heat exchanger and the nitrogen is vented to the atmosphere.

In the present invention, the liquid nitrogen heat exchanger comprises a plurality of separate heat exchanger chambers in the form of elongated tube mounted in a vertically spaced relationship in a rack. The chambers having capillary tubes on the exterior are alternately positioned with adjacent chambers having no capillary tubes, but which are filled with heat transferring and flow impeding particulate materials such as copper filings (as well as a desiccant), with the various chambers being connected together in series from the inlet in the lowermost chamber to an outlet in the upper chamber.

The apparatus of the present invention provides an efficient and very effective heat exchanger for use with refrigerated transportation containers. The system eliminates the cost, noise, pollution and expense of a conventional diesel refrigeration system and provides instead a less expensive, quiet, easy to maintain, nonpolluting refrigeration system using bottled refrigerant that can be produced in a centralized location capable of using sophisticated and controlled techniques for liquefying the refrigerant.

These and other advantages and features of the present invention will hereinafter appear in connection with the following drawings and description of the preferred embodiments of the present invention.

DETAILED DESCRIPTION OF PREFERRED EMBODIMENTS

Figure 1:
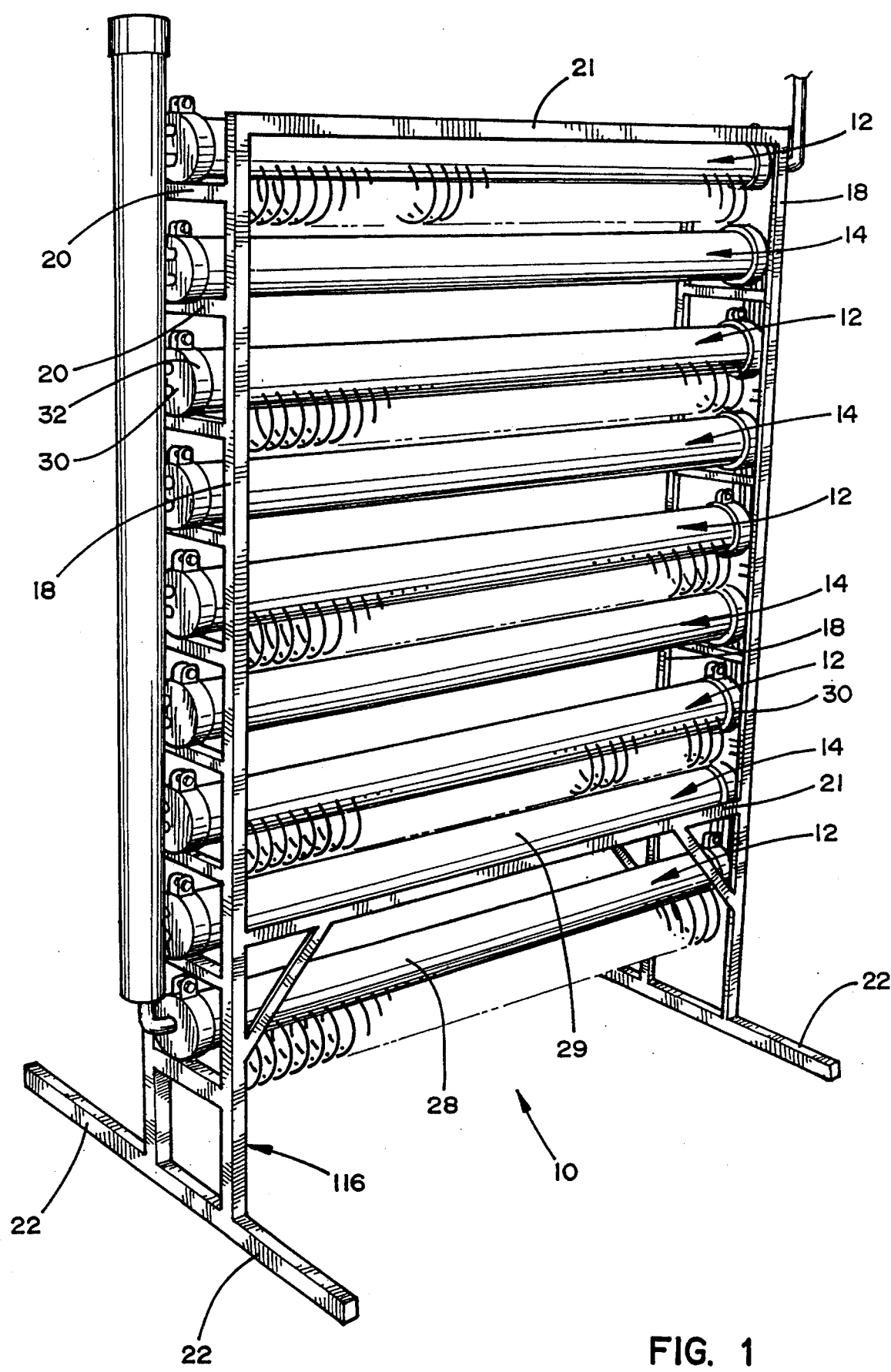
FIG. 1 is a perspective view of a liquid nitrogen capillary heat exchanger constructed in accordance with the present invention.

Referring the drawings and more particularly FIG. 1, a heat exchanger 10 constructed in accordance with the present invention comprises a series of heat exchanger chambers 12 14 spaced vertically apart in alternating arrangement in a support rack 16. Support rack 16 comprises a pair of spaced vertical support members 18 positioned at each end of the rack and interconnected by cross-members 20 and longitudinal members 21. A base 22 is connected at the bottom of the support members and extends outwardly from each side thereof in order to provide support for the rack.

Chambers 12 and 14 are substantially the same in construction, with the exception that chambers 12 have a series of capillary tubes 24 and 26 spaced along the longitudinal length of each chamber. Chambers 12 desirably are copper pipes 28 having a four and one-half inch O.D. and a wall thickness of ¼ inches. The pipes in the preferred embodiment are about 56 inches long. Caps 30 are removably fitted on the ends of the pipes by welded ends on the pipes and on the interior of the caps or by other such suitable fasteners. A pressure tight fit is essential. The pipes are mounted in the rack with the end caps 30 resting on cross-members 20 of the rack and with flexible metal bands 32 extending from the cross-member one side of the cap over the top of each cap and then down into attachment with the cross-member on the other side of the cap. The bands are held in place by removable fasteners.

While the pipes for chambers 12 and 14 are substantially the same, with the exception of the capillary tubes 32, for convention, the pipe for chamber 12 will be referred to as pipe 28 and the pipe for chamber 14 will be referred to as pipe 29.

Figure 3:
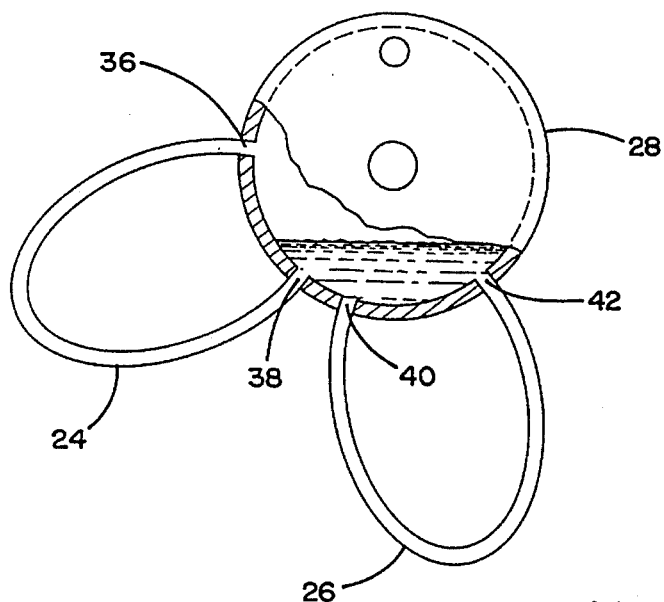
FIG. 3 is an end view of one of the chambers taken along lines 3—3 of FIG. 2.

Referring to the construction of chamber 12, pipe 28 includes a series of small openings one-quarter inch in diameter at four separate angularly spaced locations at each of 51 axial positions along the pipe, with each series of openings preferably being spaced axially apart by a distance of one inch. The first three inches at each end of the pipe has no openings. As shown in FIG. 3, the openings in pipe 28 comprise a horizontal opening 36 at the left hand side of the pipe, an opening 38 positioned downwardly therefrom by an angle of 45 degrees, an opening 40 positioned downwardly from opening 36 a distance of 78 degrees, and an opening 42 positioned upwardly to the right from a vertical position by a distance of 35 degrees. Capillary tubes 24 and 26, which are about nine inches long, form elongated loops as shown and are fitted and welded into these openings. Each capillary tube is formed of copper and preferably has a one-quarter inch O.D. and a one-sixteenth (¹⁄₁₆) inch I.D. An inside diameter range of between ¼ to ¼ is preferred for the capillary tubes. The capillary tubes extend all the way through the walls of the pipes so that the interior of the capillary tubes is in communication with the interior of the pipes. All of chambers 12 are of substantially the same construction.

Pipes 29 have no capillary tubes attached to the outside thereof but are filled with a heat transmissive particulate material, preferably copper filings 31. The copper filings improve the heat transfer in the interior of the pipe and also serve to slow down the flow of refrigerant through the pipe so as to maximize heat transfer. It is desirable to have the flow of refrigerant through the system be slow enough that the amount of heat that the refrigerant can absorb from the exterior environment is maximized and the back pressure caused by vaporization is controlled.

Figure 2:
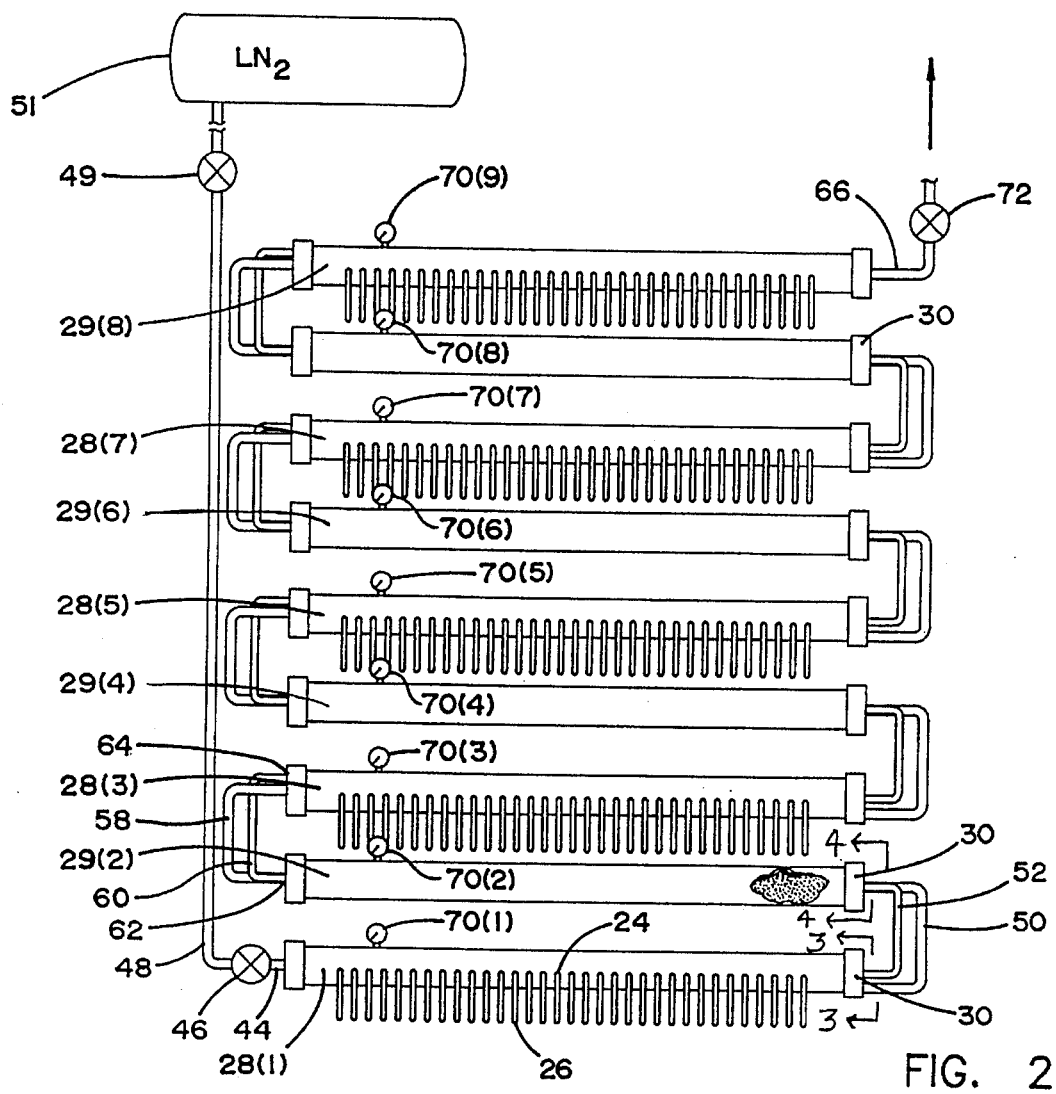
FIG. 2 is a front elevational view of the capillary heat exchanger.
Figure 4:
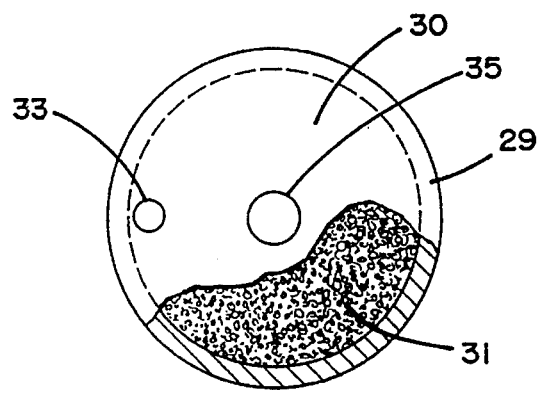
FIG. 4 is an end view of one of the chambers taken along lines 4—4 of FIG. 2.
Figure 5:
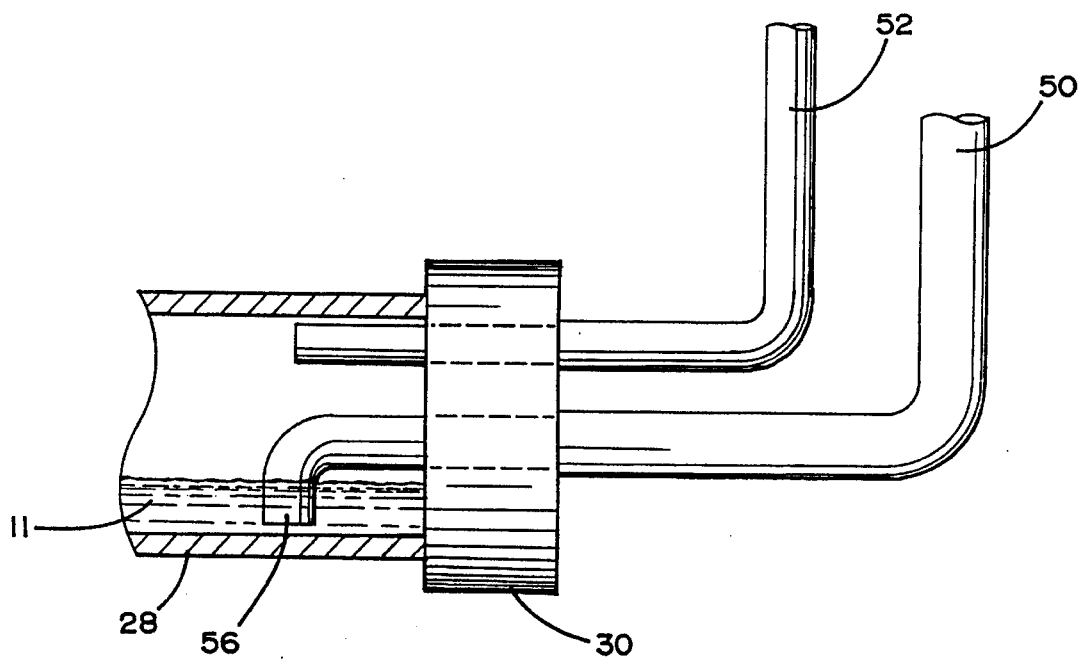
FIG. 5 is a sectional view of one of the chambers taken along lines 5—5 of FIG. 2.

As shown in FIG. 2, all of the chambers are connected in series, starting from the first chamber at the bottom of the rack (the numbers of the chambers and tubes in serial order from bottom to top being indicated in parenthesis after the number of the chamber or tube) to the last chamber or ninth chamber at the top of the rack. Pipe 28(1) has in inlet 44 at the left hand end (FIG. 2), which is connected through an inlet orifice valve 46 to a conduit 48 leading upwardly through a relief valve 49 to a suitable source of liquid nitrogen, which is maintained under pressure in a conventional pressurized tank 51 of the type that can be purchased commercially from any number of vendors. The right hand end of pipe 28(1) is connected through openings in the end cap to a larger pipe 50 and a smaller pipe 52 leading upwardly to corresponding openings in the right hand end cap of pipe 29(2). Pipe 50 has a three-quarter inch O.D. and pipe 52 has a one-quarter inch O.D. As shown in FIG. 2, the level of liquid nitrogen 54 in pipe 28(1) covers the bottom of the pipe and does not fill the entire pipe. An inlet 56 of pipe 50 extends inwardly into the interior of pipe 28(1) and then downwardly under the surface of the liquid nitrogen 11 in the pipe, so that pipe 50 will be filled with liquid. The smaller pipe 52 is in communication with the vapor portion of the interior of pipe 28(1) and conveys vapor into the next adjacent pipe. Pipe 52 enters the end cap of pipe 29(2) in an opening 33 on the left hand side of the end cap on the horizontal axis, while pipe 50 enters the pipe at an opening 35 at the axis (FIG. 4).

On the left hand side of pipe 29(2), a large pipe 58 corresponding with pipe 50 exits pipe 29(2) and extends upwardly to the left hand end of 29(3), with the pipe exiting from the axis of the pipe and entering in the axis of the next adjacent pipe. A smaller pipe 60 exits from an opening 62 on the right hand side of the end cap at the horizontal axis and extends upwardly into an opening 64 in the upper portion of the end cap on the vertical axis.

All of the pipes in the heat exchanger are connected in the same way, so that liquid nitrogen enters the heat exchanger in the left hand end of the lowermost pipe for level control, extends backwardly and forwardly through each of the pipes as it moves upwardly through the heat exchanger, and then exits from an outlet opening 66 at the right hand end of the uppermost pipe 29(9). The movement of the liquid and the gas through the heat exchangers is caused by the vapor pressure of nitrogen as it evaporates in the system.

Pressure gauges 70(1)–70(9) are mounted on the respective pipes 28 or 29 (1)–(9) in order to monitor the pressure in each of the pipes. Since back pressure is a critical factor in this system, it is important to maintain proper pressure in each of the pipes. In addition, a pressure valve 72 is connected to outlet 66 of the heat exchanger. This sets the threshold pressure for release of nitrogen.

The desired pressures in each of the pipes, as indicated by the pressure gauges and the pressure at the outlet pressure valve 72 are set forth in the following table.

| | |
|---|---|
| 70(1) | 24.7 psig |
| 70(2) | 23.2 psig |
| 70(3) | 22.9 psig |
| 70(4) | 21.4 psig |
| 70(5) | 21.3 psig |
| 70(6) | 15.1 psig |
| 70(7) | 12.9 psig |
| 70(8) | 7.5 psig |
| 70(9) | 5.2 psig |

In addition to the inclusion of copper filings in tubes 29, it is desirable to include a desiccant to remove moisture from the gas. An aluminum silicate gel, which has the appearance of small pellets, works well for this purpose.

The tubes 28 do not have the desiccant or copper filings in them but instead are provided with the capillary tubes on the exterior portions of them. The capillary tubes are extremely important features of the present invention. They provide a controlled rate of vaporization of the nitrogen while at the same time providing the equivalent of cooling fins on the heat exchanger to provide added exterior surface area for improving the cooling capacity of the heat exchanger. Because of the small diameter of the capillary tubes, liquid nitrogen in the capillary tubes cannot flash or boil turbulently in the tubes. Instead, the capillary tubes have a controlling effect on liquid nitrogen that controls the vaporization of the liquid nitrogen. The nitrogen vaporizes in the capillary tube by a phenomenon known as film boiling. While liquid nitrogen vaporizes by film boiling under other conditions as well, when nitrogen vaporizes in a capillary tube by the process of film boiling, a thicker than normal layer of vapor or gas is formed at the wall of the capillary tube, thus insulating the liquid nitrogen from the much warmer wall of the capillary tube. This slows the vaporization rate of the nitrogen. At the same time, the vapor adjacent the walls flows in a laminar flow pattern to the outlet of the capillary tube and then into the larger interior of the pipe. The laminar flow improves the refrigerating effectiveness of the heat exchanger. In short, the capillary tubes provide an effective way of controlled vaporization of an otherwise very volatile liquid.

In operation of the system, liquid nitrogen is provided to the pressure control valve at the inlet of pipe 28(1). The liquid flows through that pipe filling the capillary tubes while at the same time partially filling the pipe. Vaporized gas collects in the upper portion of the pipe while the liquid settles to the lower portion of the pipe. The capillary tubes draw the liquid into the capillary tubes and gradually permit the liquid to vaporize before discharging the vapor through the outlets of the capillary tubes. After the liquid has passed through pipe 28(1), the liquid flows upwardly to the next pipe, which is filled with a desiccant and copper filings. The rate of flow of the gas is impeded by the copper filings and the gas is dried by the desiccant. The gas and liquid thus have a controlled rate of flow through the heat exchanger, being checked by the pipe full of copper filings after each pass through a chamber having capillary tubes. This maximizes the amount of time that the refrigerated vapor is in contact with the heat exchanger surface and thus permits a maximum amount of refrigerating effect with a given amount of gas. The gas proceeds back and forth through the pipes until it reaches the outlet and then passes through the outlet and through back pressure control valve 72. Because of the controlled rate of vaporization and flow provided by the capillary tubes and by the valves and alternating pipes, the heat exchanger of the present invention provides a cost effective alternative to conventional compressor operated refrigerated systems, while at the same time providing the benefits of low noise, diesel operating expense, and environmental pollution.

The heat exchanger is used in the place of a conventional heat exchanger in a cooling system. A fan or the like causes air to flow over the heat exchanger chambers and capillary tubes in order to chill the air in the refrigerated container. These elements are conventional and are not shown. In addition, heater wires can be wrapped around the elements of the heat exchanger to defrost the exchanger periodically.

It should be understood that the foregoing is merely representative of the preferred practice of the present invention and that various changes in the arrangements and details of construction can be employed without departing from the spirit and scope of the present invention, which is defined in the attached claims.

I claim:

1. A capillary heat exchanger for vaporizing liquid nitrogen received from a pressurized container comprises a vaporization chamber having an inlet at one end of the chamber connected to the liquid nitrogen container through a pressure release valve, and an outlet at an opposite end of the chamber, the chamber comprising an elongated enlarged chamber having enclosed exterior walls that are capable of withstanding the vaporization pressures exerted by liquid nitrogen therein, a plurality of capillary tubes being mounted on the exterior of the chamber and spaced along the chamber, with the capillary tubes having inlets and outlets in communication with the interior of the chamber and forming loops extending between the inlets and the outlets on the exterior of the chamber, the inlets of the capillary tubes being positioned adjacent a portion of the chamber that is covered by liquid nitrogen as it flows through the chamber, such that liquid nitrogen can flow into the capillary tubes through the inlets, the capillary tubes permitting vaporization of the liquid nitrogen under controlled pressure and heat transfer conditions that are not present in the chamber, with the exterior walls of the capillary tubes providing increased surface areas for cooling purposes, the nitrogen being vented to the atmosphere after the nitrogen has been vaporized and has absorbed heat from a refrigeration compartment on the outside of the heat exchanger.

2. A capillary heat exchanger according to claim 1 wherein the heat exchanger comprises a plurality of separate heat exchanger chambers mounted in a vertically spaced relationship in a rack, with the vaporization chambers having capillary tubes on the exterior being alternately positioned adjacent flow control chambers having no capillary tubes but being filled with heat transferring particulate materials that check the rate of flow of refrigerant therethrough, with the various chambers being connected together in series, with a heat exchanger inlet and outlet being connected to the opposite ends of the series connected chambers.

3. A capillary heat exchanger according to claim 2 wherein the heat exchanger is connected to the lowermost chamber and the outlet is connected to the uppermost chamber.

4. A capillary heat exchanger according to claim 2 wherein the chambers comprise elongated tubular members having closed ends, with the tubular members being interconnected by smaller tubes connected between the ends of adjacent tubular members through openings therein.

5. A capillary heat exchanger as claimed in claim 2 wherein the flow control chambers also include a particulate desiccant material that retains liquid $N_2$ from the vaporized gas.

6. A capillary heat exchanger according to claim 1 wherein the vaporization chambers comprise a pair of angularly spaced capillary tubes connected to the vaporization chambers at each of a plurality of axial positions along the chamber, with each capillary tube having an inlet in the chamber at a position low enough to receive liquid nitrogen therein from the interior of the chamber.

7. A capillary heat exchanger according to claim 1 wherein the capillary tubes have an inside diameter of ¼ to ¹⁄₁₆ inches.

8. A capillary heat exchanger according to claim 1 wherein the capillary tubes have an inside diameter of about one-sixteenth inch.

9. A capillary heat exchanger according to claim 1 wherein the vaporization chamber is a tubular member about four and one-half inches in diameter and the capillary tubes are about nine inches long and have an insider diameter of about one-sixteenth inch, the tubular member comprising two capillary tubes angularly spaced at each of a plurality of axial position on the tubular member, with the capillary tube being axially spaced apart by about an inch.

\* \* \* \* \*